US012756011B2

(12) United States Patent
Zhou et al.

(10) Patent No.: US 12,756,011 B2

(45) Date of Patent: Oct. 6, 2026

(54) ELECTROLYTE, ELECTROCHEMICAL DEVICE CONTAINING SAME, AND ELECTRONIC DEVICE

(71) Applicant: Ningde Amperex Technology Limited, Ningde City (CN)

(72) Inventors: Shaoyun Zhou, Ningde (CN); Chao Tang, Ningde (CN)

(73) Assignee: NINGDE AMPEREX TECHNOLOGY LIMITED, Ningde City (CN)

(*) Notice: Subject to any disclaimer, the term of this patent is extended or adjusted under 35 U.S.C. 154(b) by 827 days.

(21) Appl. No.: 17/957,265

(22) Filed: Sep. 30, 2022

(65) Prior Publication Data

US 2023/0100156 A1 Mar. 30, 2023

(30) Foreign Application Priority Data

Sep. 30, 2021 (CN) .......................... 202111161660.4

(51) Int. Cl.

*H01M 10/0566* (2010.01)
*H01M 4/505* (2010.01)
*H01M 4/525* (2010.01)
*H01M 10/0525* (2010.01)
*H01M 4/02* (2006.01)

(52) U.S. Cl.

CPC ....... *H01M 10/0566* (2013.01); *H01M 4/505* (2013.01); *H01M 4/525* (2013.01); *H01M 10/0525* (2013.01); *H01M 2004/028* (2013.01); *H01M 2300/0051* (2013.01)

(58) Field of Classification Search

CPC .. H01M 10/0566; H01M 4/505; H01M 4/525; H01M 10/0525; H01M 2004/028; H01M 2300/0051

See application file for complete search history.

(56) References Cited

U.S. PATENT DOCUMENTS

| | | | |
|---|---|---|---|
| 2012/0313570 A1 | | 12/2012 | Ohtaniuchi et al. |
| 2014/0322576 A1 | * | 10/2014 | Okumura et al. |
| 2015/0221977 A1 | | 8/2015 | Hallac et al. |

FOREIGN PATENT DOCUMENTS

| | | | | |
|---|---|---|---|---|
| CN | 101299471 A | | 11/2008 |
| CN | 102324568 A | | 1/2012 |
| CN | 103022467 A | | 4/2013 |
| CN | 103268956 A | | 8/2013 |
| CN | 103700884 A | | 4/2014 |
| CN | 104900917 A | | 9/2015 |
| CN | 106159325 A | | 11/2016 |
| CN | 106299324 A | | 1/2017 |
| CN | 110061292 A | | 7/2019 |
| CN | 111106387 A | | 5/2020 |
| CN | 111293362 A | | 6/2020 |
| CN | 111509298 A | | 8/2020 |
| CN | 111540945 A | * | 8/2020 |
| CN | 112599852 A | | 4/2021 |
| CN | 112993399 A | | 6/2021 |
| CN | 113206296 A | | 8/2021 |
| CN | 113410511 A | | 9/2021 |
| CN | 113451646 A | | 9/2021 |
| EP | 2535976 A1 | | 12/2012 |
| EP | 3176864 A1 | | 6/2017 |
| JP | 2007179883 A | | 7/2007 |
| JP | 2008-016414 A | | 1/2008 |
| JP | 2010-238505 A | | 10/2010 |
| JP | 2013-239307 A | | 11/2013 |

OTHER PUBLICATIONS

First Office Action dated Jun. 1, 2022, issued in counterpart CN Patent Application No. 202111161660.4, w/English translation (13 pages).

European Search Report dated Feb. 24, 2023, issued in counterpart EP Application No. 22199166.4. (11 pages).

Notice of Allowance dated Jan. 28, 2023, issued in CN Application No. 202111161660.4. (4 pages).

Office Action dated Sep. 9, 2025, issued in counterpart CN Application No. 202310384832.7. (9 pages).

Office Action dated Sep. 9, 2025, issued in counterpart CN Application No. 202310384829.5. (9 pages).

Office Action dated Feb. 11, 2026, issued in counterpart CN Application No. 202310384829.5. (20 pages).

Ding, W., Synthesis and modification of high-voltage ternary cathode materials for lithium-ion batteries, Metallurgical Industry Press, p. 224-227, Mar. 31, 2019, with English translation. (8 pages); cited in CN Office Action dated Feb. 11, 2026.

Chengwei, X., Electric Vehicle Engineering Manual vol. IV: Power Battery, Beijing: China Machine Press, p. 146-149, Dec. 31, 2019, with English translation. (9 pages); cited in CN Office Action dated Feb. 11, 2026.

Office Action dated Mar. 7, 2026, issued in counterpart CN Application No. 2023103848327. (14 pages).

Ding, W., Synthesis and modification of high-voltage ternary cathode materials for lithium-ion batteries, Metallurgical Industry Press, p. 121-124, Mar. 31, 2019, with English translation. (9 pages); cited in CN Office Action dated Mar. 7, 2026.

(Continued)

*Primary Examiner* — Jonathan Johnson

(74) *Attorney, Agent, or Firm* — WHDA, LLP

(57) ABSTRACT

An electrolyte, an electrochemical device containing same, and an electronic device. Specifically, an electrolyte, including dimethyl carbonate, ethyl methyl carbonate, and lithium bis(oxalato)borate. The ethyl methyl carbonate and the lithium bis(oxalato)borate each account for a specified weight percent in the electrolyte, and the weight percent of the dimethyl carbonate and the weight percent of the ethyl methyl carbonate in the electrolyte meet a specified relationship. The electrolyte provides with balanced rate performance, the low-temperature discharge performance, and the high-temperature storage and cycle performance of the electrochemical device, and helps to achieve excellent comprehensive performance of the electrochemical device.

19 Claims, No Drawings

(56) References Cited

OTHER PUBLICATIONS

Office Action dated May 7, 2026, issued in counterpart CN Application No. 202310384833.1. (7 pages).

* cited by examiner

ELECTROLYTE, ELECTROCHEMICAL DEVICE CONTAINING SAME, AND ELECTRONIC DEVICE

CROSS REFERENCE TO RELATED APPLICATIONS

The present application claims priority to Chinese Patent application no. CN 202111161660.4 filed in the China National Intellectual Property Administration on Sep. 30, 2021, the entire content of which is hereby incorporated by reference.

TECHNICAL FIELD

This application relates to the field of energy storage, and in particular, to an electrolyte, an electrochemical device containing same, and an electronic device.

BACKGROUND

By virtue of a high voltage, a high capacity, a long life, and no memory effect, electrochemical devices (such as a lithium-ion battery) have been widely used in various parts of people's everyday life, for example, in the fields of digital products and electric vehicles. To improve the competitive edge, manufacturers or developers usually reduce the amount of auxiliary materials such as a current collector foil for use in the battery by increasing an areal density and a compacted density of a coating layer on a positive electrode or negative electrode, so as to indirectly reduce cost and improve an energy density of the battery. However, after the areal density and compacted density are increased, in order to meet application requirements, higher requirements are imposed on the infiltration capabilities and kinetic performance of the electrolyte.

In view of this, it is necessary to provide an improved electrolyte that helps to enhance comprehensive performance of the electrochemical devices, an electrochemical device containing the electrolyte, and an electronic device.

SUMMARY

This application provides an electrolyte, an electrochemical device containing same, and an electronic device in an attempt to solve at least one problem in the related art to at least some extent.

According to one aspect of this application, this application provides an electrolyte, including dimethyl carbonate, ethyl methyl carbonate, and lithium bis(oxalato)borate. Based on a weight of the electrolyte, a weight percent of the dimethyl carbonate is a %, a weight percent of the ethyl methyl carbonate is b %, and a weight percent of the lithium bis(oxalato)borate is c %, where $40<a+b<70$, $15.1\leq b\leq 55$, and $0<c<1$.

According to an embodiment of this application, $c/a>0.006$.

According to an embodiment of this application, $a<45$.

According to an embodiment of this application, the electrolyte further includes ethylene carbonate, and, based on the weight of the electrolyte, a weight percent of the ethylene carbonate is d %, and $15<d\leq 35$.

According to an embodiment of this application, the electrolyte further includes 1,3-propane sultone. Based on the weight of the electrolyte, a weight percent of the 1,3-propane sultone is e %, where $e<3$ and $0.6\leq e/c\leq 20$.

According to an embodiment of this application, the electrolyte further includes vinylene carbonate. Based on the weight of the electrolyte, a weight percent of the vinylene carbonate is f %, where $f<2$ and $0.5\leq f+c\leq 2.5$.

According to another aspect of this application, this application provides an electrochemical device, including a positive electrode and an electrolyte according to this application. The positive electrode includes a positive active material. The positive active material includes manganese.

According to an embodiment of this application, an electrolyte retention coefficient of the electrolyte is h g/Ah, and $0.15\leq(e+c)/h\leq 5$.

According to an embodiment of this application, $0.3\leq h\leq 4$.

According to an embodiment of this application, $D_{v50}$ of the positive active material is j μm, and $1\leq j\times c\leq 30$.

According to an embodiment of this application, the positive active material further includes a metal element A. The metal element A includes at least one selected from the group consisting of Al, Mg, Ti, Ca, Zr, W, Sr, Y, and Nb. Based on a weight of the positive active material, a weight percent of the metal element A is less than or equal to 2%.

According to an embodiment of this application, the positive active material includes at least one of a compound represented by Formula (1) or a compound represented by Formula (2):

$$Li_{x1}Mn_{y1}M_{z1}A_{q1}R_{r1}O_2; \quad \text{and} \qquad \text{Formula (1)}$$

$$Li_{x2}Mn_{y2}M_{z2}A_{q2}R_{r2}O_4. \qquad \text{Formula (2)}$$

In the formulas above:

$0.5<x1<1.2$, $0.05<y1\leq 0.4$, $0.55\leq z1\leq 0.95$, $0\leq q1<0.05$, $0\leq r1<0.05$;

$0.5<x1<1.2$, $1.8\leq y2\leq 2.2$, $0\leq z2<0.1$, $0\leq q2<0.05$, $0\leq r2<0.05$;

M is at least one selected from Ni or Co:

A is at least one selected from Al, Mg, Ti, Ca, Zr, W, Sr, Y, Cr, or Nb; and

R is at least one selected from P, S, F, Si, or B.

According to still another aspect of this application, this application provides an electronic device. The electronic device includes the electrochemical device according to this application.

The electrolyte according to this application is highly infiltrative and achieves high kinetic performance, and can effectively suppress the dissolution and deposition of metal elements in the positive active material, thereby effectively balancing the high-temperature storage performance, the high-temperature cycle performance, the rate performance, and the low-temperature discharge performance of the electrochemical device, and helping to achieve excellent comprehensive performance of the electrochemical device.

Additional aspects and advantages of this application will be partly described or illustrated later herein or expounded through implementation of the embodiments of this application.

DETAILED DESCRIPTION

Embodiments of this application will be described in detail below. The embodiments of this application are not to be construed as a limitation on this application.

In the detailed description of embodiments and claims, a list of items referred to by using the terms such as "at least one of" may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements. The terms "at least one of" and "one or more of" have the same meaning.

Electrolyte

A small amount of metal elements (such as nickel or manganese) in a positive active material of an electrochemical device (such as a lithium-ion battery) dissolves out, enters an electrolyte, and deposits on a negative electrode. This affects stability of a positive active material, damages an anode electrolyte interface, and induces decomposition of an electrolyte solvent, thereby affecting the performance such as rate performance, low-temperature discharge performance, and high-temperature storage and cycle performance of the electrochemical device.

In terms of research and development of the electrolyte, researchers focus on the selection of the solvent. Diethyl carbonate (DEC) used in a solvent can reduce the dissolution of metal elements in the positive active material to some extent. However, the DEC possesses a relatively high viscosity and a relatively low dielectric constant. As the electrochemical device expands in size and the areal density and compacted density of the positive active material layer increase, the infiltration efficiency of the electrolyte for the battery and the kinetic performance of the battery are impaired.

To solve the problem that the metal elements in the positive active material in the electrochemical device are dissolved out and deposited on a negative electrode and thereby adversely affect the performance of the electrochemical device, this application provides an electrolyte, including dimethyl carbonate (DMC), ethyl methyl carbonate (EMC), and lithium bis(oxalato)borate (LiBOB). Based on a weight of the electrolyte, a weight percent of the dimethyl carbonate is a %, a weight percent of the ethyl methyl carbonate is b %, and a weight percent of the lithium bis(oxalato)borate is c %, where $40<a+b<70$, $15.1\leq b\leq 55$, and $0<c<1$.

The DMC and EMC are two low-viscosity linear carbonate solvents, and help to improve the infiltration effect and kinetic performance of the electrolyte. However, the two solvents, especially the DMC, are highly capable of dissolving the metal elements in the positive active material. Therefore, the weight percent thereof needs to be controlled within a given range to reduce occurrence of the dissolution.

The LiBOB can form a stable solid electrolyte interface (SEI) film on the positive electrode and the negative electrode. The positive SEI film can effectively reduce direct contact between the positive active material and the electrolyte, and reduce the dissolution of metal elements. The negative SEI film can reduce the deposition of the metal elements dissolved out of the positive active material and the damage thereby caused to the anode electrolyte interface, thereby reducing the loss of an irreversible capacity during storage or cycling of the electrochemical device. However, a resistance of the SEI film formed by LiBOB is relatively high. An excessive content of LiBOB affects the rate performance and low-temperature discharge performance of the electrochemical device. In addition, when the electrochemical device is in a relatively high state of charge (SOC), the excess LiBOB decomposes by itself to generate a trace amount of gas. The gas affects the high-temperature storage performance of the electrochemical device. Therefore, the weight percent of the LiBOB needs to be controlled to be relatively low.

This application optimizes the weight percent of the DMC, EMC, and LiBOB. When $a+b\leq 40$, the viscosity of the electrolyte is relatively high, and the rate performance or low-temperature discharge performance of the electrochemical device is relatively low. When $a+b\geq 70$, because the DMC and EMC possess a relatively low boiling point and are highly capable of dissolving out the metal elements, the high-temperature storage performance and high-temperature cycle performance of the electrochemical device are relatively low. When b is less than 15.1, the weight percent of the EMC in the electrolyte is relatively low, the weight percent of the DMC is relatively high, and the amount of metal elements dissolved out of the positive active material increases, resulting in inferior high-temperature storage performance and inferior high-temperature cycle performance of the electrochemical device. When b is greater than 55, the weight percent of the EMC in the electrolyte is relatively high, and the weight percent of the DMC is relatively low, thereby impairing the rate performance of the electrochemical device. When the electrolyte contains no LiBOB, the cathode electrolyte interface and the anode electrolyte interface of the electrochemical device cannot be effectively protected. The metal elements dissolved out of the positive active material are heavily deposited on the negative electrode, thereby resulting in inferior high-temperature storage performance and inferior high-temperature cycle performance of the electrochemical device. When the weight percent c of the LiBOB in the electrolyte is greater than or equal to 1%, a residue of the LiBOB is left after the SEI film is formed on the positive electrode and the negative electrode. This leads to gassing and expansion of the electrochemical device stored at a high temperature. In addition, the excess LiBOB increases the film formation resistance, thereby impairing the rate performance and low-temperature discharge performance of the electrochemical device.

When the weight percent of each of the DMC, EMC, and LiBOB falls within the range specified herein, the electrolyte is highly infiltrative and achieves high kinetic performance, and can effectively suppress the dissolution and deposition of metal elements in the positive active material, thereby effectively balancing the high-temperature storage performance, the high-temperature cycle performance, the rate performance, and the low-temperature discharge performance of the electrochemical device, and helping to achieve excellent comprehensive performance of the electrochemical device.

In some embodiments, $45\leq a+b\leq 65$. In some embodiments, $45\leq a+b\leq 60$. In some embodiments, a+b is 42, 45, 50, 55, 60, 65, or 68, or falls within a range formed by any two thereof.

In some embodiments, $18\leq b\leq 50$. In some embodiments, $20\leq b\leq 45$. In some embodiments, $25\leq b\leq 45$. In some embodiments, b is 15.1, 18, 20, 25, 30, 35, 40, 45, 50, or 55, or falls within a range formed by any two thereof.

In some embodiments, $0.01\leq c\leq 0.8$. In some embodiments, $0.05\leq c\leq 0.6$. In some embodiments, $0.1\leq c\leq 0.5$. In some embodiments, $0.2\leq c\leq 0.4$. In some embodiments, c is 0.01, 0.05, 0.1, 0.3, 0.5, 0.8, or 0.9, or falls within a range formed by any two thereof.

In some embodiments, c/a is greater than 0.006. In some embodiments, c/a is greater than or equal to 0.01. In some embodiments, c/a is greater than or equal to 0.03. In some embodiments, c/a is greater than or equal to 0.05. When the weight percent of the DMC increases, more LiBOB is required to stabilize the cathode electrolyte interface and the anode electrolyte interface. Therefore, controlling the c/a ratio within the foregoing range helps to further balance the high-temperature storage performance, the high-temperature cycle performance, the rate performance, and the low-temperature discharge performance of the electrochemical device, thereby improving the comprehensive performance of the electrochemical device.

In some embodiments, a is less than 45. In some embodiments, a is less than or equal to 40. In some embodiments, a is less than or equal to 35. In some embodiments, a is less than or equal to 30. In some embodiments, a is less than or equal to 25. In some embodiments, a is less than or equal to 20. The DMC is more capable of dissolving out the metal elements in the positive active material than the EMC, and the boiling point of the DMC is lower than that of the EMC. Controlling the weight percent a % of the DMC within the foregoing range helps to further balance the high-temperature storage performance, the high-temperature cycle performance, the rate performance, and the low-temperature discharge performance of the electrochemical device, thereby improving the comprehensive performance of the electrochemical device.

In some embodiments, the electrolyte further includes ethylene carbonate (EC). Based on the weight of the electrolyte, a weight percent of the ethylene carbonate is d %, and $15<d\le35$. In some embodiments, $18\le d\le30$. In some embodiments, $20\le d\le25$. In some embodiments, d is 16, 18, 20, 22, 25, 28, 30, 32, or 35, or falls within a range formed by any two thereof. In a carbonate solvent, the EC helps to achieve a relatively high conductivity of the electrolyte. In addition, the EC can participate in the formation and repair of an anode electrolyte interface (AEI) film. When the electrolyte includes the EC of the foregoing weight percent, the EC helps to further balance the high-temperature storage performance, the high-temperature cycle performance, the rate performance, and the low-temperature discharge performance of the electrochemical device, thereby improving the comprehensive performance of the electrochemical device.

In some embodiments, the electrolyte further includes 1,3-propane sultone (PS). Based on the weight of the electrolyte, a weight percent of the 1,3-propane sultone is e %, where $e<3$ and $0.6\le e/c\le20$. In some embodiments, e is less than 2.5. In some embodiments, e is less than 2. In some embodiments, e is less than 1.5. In some embodiments. $1\le e/c\le18$. In some embodiments, $3\le e/c\le15$. In some embodiments, $5\le e/c\le10$. In some embodiments, $6\le e/c\le8$. In some embodiments, e/c is 0.6, 1, 2, 5, 8, 10, 12, 15, 18, or 20, or falls within a range formed by any two thereof. The PS can form a solid electrolyte interface (SEI) film on the positive and negative electrodes of the electrochemical device. The SEI film is relatively stable under high temperatures. Therefore, the SEI film can improve the high-temperature performance of the electrochemical device, and is conducive to reducing the thickness expansion rate of the electrochemical device stored at a high temperature. In addition, the PS that remains in the electrochemical device is prevented from decomposing and gassing. Therefore, when the electrolyte includes the PS, the PS can effectively alleviate the problem of volume expansion of the electrochemical device stored at a high temperature, where the volume expansion is caused by the decomposition and gassing of the LiBOB itself. The resistance of the SEI film formed by the PS is relatively high. Therefore, controlling the weight percent of the PS within the foregoing range helps to further balance the high-temperature storage performance, the high-temperature cycle performance, the rate performance, and the low-temperature discharge performance of the electrochemical device, thereby improving the comprehensive performance of the electrochemical device.

In some embodiments, the electrolyte further includes vinylene carbonate (VC). Based on the weight of the electrolyte, a weight percent of the vinylene carbonate is f %, where $f<2$, and $0.5\le f+c\le2.5$. In some embodiments, f is less than 1.5. In some embodiments, f is less than 1.2. In some embodiments, f is less than 1. In some embodiments, $0.8\le f+c\le2$. In some embodiments, $1\le f+c\le1.8$. In some embodiments, $1.2\le f+c\le1.5$. In some embodiments, f+c is 0.5, 0.8, 1, 1.2, 1.5, 2, 2.2, or 2.5, or falls within a range formed by any two thereof. Both the VC and the LiBOB can form a dense SEI film on the negative electrode, but the resistance of the formed SEI film is relatively high. When the electrolyte includes the VC of the foregoing weight percent, and the weight percent f % of the VC and the weight percent c % of the LiBOB satisfy the foregoing relationship, the VC helps to further balance the high-temperature storage performance, the high-temperature cycle performance, the rate performance, and the low-temperature discharge performance of the electrochemical device, thereby improving the comprehensive performance of the electrochemical device.

According to an embodiment of this application, the electrolyte further includes lithium hexafluorophosphate ($LiPF_6$). In some embodiments, based on the weight of the electrolyte, the weight percent of the lithium hexafluorophosphate is 8% to 17%. In some embodiments, based on the weight of the electrolyte, the weight percent of the lithium hexafluorophosphate is 10% to 15%.

The electrolyte according to this application may be prepared using any known method. In some embodiments, the electrolyte according to this application may be prepared by mixing components.

Positive Electrode

The positive electrode includes a positive current collector and a positive active material disposed on one surface or both surfaces of the positive current collector.

In some embodiments, the positive active material includes manganese.

In some embodiments, $D_{v50}$ of the positive active material is j μm, and $1\le j\times c\le30$. In some embodiments, $2\le j\times c\le25$. In some embodiments, $5\le j\times c\le20$. In some embodiments, $5\le j\times c\le15$. In some embodiments, j×c is 1, 5, 10, 15, 20, 25, or 30, or falls within a range formed by any two thereof. With a different particle size of the positive active material, the area of the material particles in direct contact with the electrolyte varies, and the amount of LiBOB required in the electrolyte also varies. When $D_{v50}$ of the positive active material and the weight percent c % of the LiBOB satisfy the foregoing relationship, the active material helps to further balance the high-temperature storage performance, the high-temperature cycle performance, the rate performance, and the low-temperature discharge performance of the electrochemical device, thereby improving the comprehensive performance of the electrochemical device.

$D_{v50}$ of the positive active material in the lithium-ion battery may be determined by the following method: Measuring $D_{v50}$ of the positive active material with a Malvern laser particle size analyzer; or, discharging the lithium-ion battery until the voltage reaches 2.8 V, and putting the positive electrode in a dimethyl carbonate solution to soak for 4 hours, then drying at 80° C. for 12 hours, taking off the positive active material layer, burning the positive active material layer for 4 hours at a constant temperature of 400° C. in an air atmosphere to obtain a positive active material, and then measuring $D_{v50}$ of the positive active material with a Malvern laser particle size analyzer.

In some embodiments, 1≤j≤80. In some embodiments, 3≤j≤50. In some embodiments, 4≤j≤30. In some embodiments, 5≤j≤25. In some embodiments, 6≤j≤23. In some embodiments, j is 1, 2, 3, 4, 5, 6, 10, 12, 15, 20, 23, 25, 30, 35, 40, 45, 50, 60, 70, or 80, or falls within a range formed by any two thereof.

In some embodiments, the positive active material further includes a metal element A. The metal element A includes at least one selected from the group consisting of Al, Mg, Ti, Ca, Zr, W, Sr, Y, and Nb. Based on a weight of the positive active material, a weight percent of the metal element A is less than or equal to 2%. In some embodiments, based on the weight of the positive active material, the weight percent of the metal element A is less than or equal to 1.5%. In some embodiments, based on the weight of the positive active material, the weight percent of the metal element A is less than or equal to 1%. In some embodiments, based on the weight of the positive active material, the weight percent of the metal element A is less than or equal to 0.5%. Doping the positive active material helps to improve structural stability of the positive active material, thereby reducing the dissolution of the metal element. When the positive active material includes the metal element A of the foregoing weight percent, the metal element helps to further balance the high-temperature storage performance, the high-temperature cycle performance, the rate performance, and the low-temperature discharge performance of the electrochemical device, thereby improving the comprehensive performance of the electrochemical device.

In some embodiments, the positive active material includes at least one of a compound represented by Formula (I) or a compound represented by Formula (2):

$$Li_{x1}Mn_{y1}M_{z1}A_{q1}R_{r1}O_2; \text{ and} \quad \text{Formula (1)}$$

$$Li_{x2}Mn_{y2}M_{z2}A_{q2}R_{r2}O_4, \quad \text{Formula (2)}$$

In the formulas above:

0.5<x1<1.2, 0.05<y1≤0.4, 0.55≤z1≤0.95, 0≤q1<0.05, 0≤r1<0.05;

0.5<x1<1.2, 1.8≤y2≤2.2, 0≤z2<0.1, 0≤q2<0.05, 0≤r2<0.05;

M is at least one selected from Ni or Co;

A is at least one selected from Al, Mg, Ti, Ca. Zr, W. Sr, Y, Cr, or Nb; and

R is at least one selected from P, S, F, Si, or B.

In some embodiments, A is Al and at least one selected from Mg. Ti, Ca, Zr, W, Sr, Y, Cr, or Nb.

In some embodiments. A is Mg and at least one selected from Al, Ti, Ca, Zr. W, Sr, Y, Cr, or Nb.

In some embodiments, A is Al and Mg and at least one selected from Ti, Ca, Zr, W, Sr, Y, Cr, or Nb.

In some embodiments, A is Al and Mg and at least two selected from Ti, Ca, Zr, W, Sr. Y, Cr, or Nb.

In some embodiments, the positive active material includes at least one of lithium manganese oxide, lithium nickel cobalt manganese oxide, or lithium nickel cobalt aluminum oxide.

In some embodiments, the positive active material includes a compound represented by Formula (1) and a compound represented by Formula (2). A weight ratio between the compound represented by Formula (1) and the compound represented by Formula (2) in the positive active material layer is 5:95 to 95:5. In the positive active material layer, the types of components of the active material particles in the positive active material layer may be determined with an energy dispersive spectrometer (EDS), and then the weight percent of each element is determined with an inductively coupled plasma emission spectrometer (ICP), thereby determining the weight ratio between the compound represented by Formula (1) and the compound represented by Formula (2).

In some embodiments, the positive active material layer further includes a binder. The binder can strengthen bonding between particles of the positive active material, and strengthen bonding between the positive active material and a positive current collector. In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, nylon, and the like.

In some embodiments, the positive active material layer further includes a conductive material, thereby imparting conductivity to the electrode. The conductive material may include any conductive material that does not cause a chemical change. Examples of the conductive material include, but are not limited to, a carbon-based material (for example, natural graphite, artificial graphite, carbon black, acetylene black, Ketjen black, carbon fibers, and carbon nanotubes), a metal-based material (for example, metal powder, metal fiber, including copper, nickel, aluminum, silver, and the like), a conductive polymer (for example, a polyphenylene derivative), and any mixture thereof.

In some embodiments, the positive current collector includes, but is not limited to, aluminum (Al).

Negative Electrode

The negative electrode includes a negative current collector and a negative active material disposed on one surface or both surfaces of the negative current collector. The specific type of the negative active material is not limited, and may be selected as required.

In some embodiments, the negative current collector may be selected from a copper foil, a nickel foil, a stainless steel foil, a titanium foil, foamed nickel, foamed copper, a conductive-metal-clad polymer substrate, or any combination thereof.

In some embodiments, the negative active material may be one or more of natural graphite, artificial graphite, mesocarbon microbead (MCMB for short), hard carbon, soft carbon, silicon, a silicon-carbon composite, a Li—Sn alloy, a Li—Sn—O alloy, Sn, SnO, $SnO_2$, spinel-structured lithiated $TiO_2$—$Li_4$, $Ti5O1_2$, or a Li—Al alloy. Examples of the carbonaceous material include, but are not limited to, crystalline carbon, non-crystalline carbon, and a mixture thereof. The crystalline carbon may be amorphous or flake-shaped, mini-flake-shaped, spherical or fibrous natural graphite or artificial graphite. The non-crystalline carbon may be soft carbon, hard carbon, mesophase pitch carbide, calcined coke, and the like.

In some embodiments, the negative active material includes a binder. The binder strengthens bonding between particles of the negative active material and bonding between the negative active material and the current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, nylon, and the like.

In some embodiments, the negative active material includes a conductive material, thereby imparting conductivity to the electrode. The conductive material may include any conductive material that does not cause a chemical change. Examples of the conductive material include, but are not limited to, a carbon-based material (for example, carbon black, acetylene black, Ketjen black, carbon fibers, and carbon nanotubes), a metal-based material (for example, metal powder, metal fiber, including copper, nickel, aluminum, silver, and the like), a conductive polymer (for example, a polyphenylene derivative), and any mixture thereof.

Separator

In some embodiments, a separator is disposed between the positive electrode and the negative electrode to prevent short circuit. The material and the shape of the separator are not particularly limited, and may be based on any technology disclosed in the prior art. In some embodiments, the separator includes a polymer or an inorganic compound or the like formed from a material that is stable to the electrolyte according to this application.

In some embodiments, the separator includes a substrate layer. In some embodiments, the substrate layer is a non-woven fabric, film, or composite film, which, in each case, have a porous structure. In some embodiments, the material of the substrate layer is selected from at least one selected from the group consisting of polyethylene, polypropylene, polyethylene terephthalate, and polyimide. In some embodiments, the material of the substrate layer is selected from a polypropylene porous film, a polyethylene porous film, a polypropylene non-woven fabric, a polyethylene non-woven fabric, or a polypropylene-polyethylene-polypropylene porous composite film.

In some embodiments, a surface treatment layer is disposed on at least one surface of the substrate layer. In some embodiments, the surface treatment layer may be a polymer layer, an inorganic compound layer, or a hybrid layer of a polymer and an inorganic compound. In some embodiments, the polymer layer includes a polymer. The material of the polymer is at least one selected from polyamide, polyacrylonitrile, acrylate polymer, polyacrylic acid, polyacrylate, polyvinylpyrolidone, polyvinyl ether, polyvinylidene fluoride, or poly(vinylidene difluoride-co-hexafluoropropylene).

In some embodiments, the inorganic compound layer includes inorganic particles and a binder. In some embodiments, the inorganic particles are a combination of one or more selected from aluminum oxide, silicon oxide, magnesium oxide, titanium oxide, hafnium dioxide, tin oxide, cerium dioxide, nickel oxide, zinc oxide, calcium oxide, zirconium oxide, yttrium oxide, silicon carbide, boehmite, aluminum hydroxide, magnesium hydroxide, calcium hydroxide, and barium sulfate. In some embodiments, the binder is a combination of one or more selected from polyvinylidene fluoride, poly(vinylidene fluoride-co-hexafluoropropylene), polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene.

Electrochemical Device

In some embodiments, the electrolyte retention coefficient of the electrolyte in the electrochemical device is h g/Ah. and $0.15 \le (e+c)/h \le 5$. In some embodiments, $0.3 \le (e+c)/h \le 4.5$. In some embodiments, $0.5 \le (e+c)/h \le 4$. In some embodiments. $0.8 \le (e+c)/h \le 3.5$. In some embodiments, $1 \le (e+c)$ $h \le 3$. In some embodiments, (e+c)/h is 0.15, 0.3, 0.5, 0.8, 1, 1.5, 2, 2.5, 3, 3.5, 4, 4.5, or 5, or falls within a range formed by any two thereof. In some embodiments, $0.3 \le h \le 4$. In some embodiments, $0.4 \le h \le 3$. In some embodiments, h is 0.3, 0.5, 0.8, 1, 1.3, 1.5, 1.8, 2, 2.2, 2.5, 2.8, 3.0, 3.2, 3.8, or 4.0, or falls within a range formed by any two thereof.

With the electrolyte retention coefficient of the electrolyte in the electrochemical device is higher, the trace amount of hydrofluoric acid generated by the dissociated electrolyte in the electrochemical device accelerates the dissolution of the metal element in the positive active material. The excessive amount of the dissociated solvent also increases the dissolution of the metal element. Therefore, when the electrolyte retention coefficient of the electrolyte is higher, more LiBOB and PS are required to form films on the positive electrode and the negative electrode to suppress the metal element in the positive active material from being dissolved out and deposited on the negative electrode. A specified relationship exists between the total amount of LiBOB and PS required and the electrolyte retention coefficient of the electrolyte. When the electrolyte retention coefficient h of the electrolyte, the weight percent c of LiBOB, and the weight percent e of PS satisfy the foregoing relationship, such materials help to further balance the rate performance, the low-temperature discharge performance, and the high-temperature storage and cycle performance of the electrochemical device, thereby improving the comprehensive performance of the electrochemical device.

The electrolyte retention coefficient of the electrolyte in the lithium-ion battery may be determined by the following method: weighing the overall weight of the lithium-ion battery, denoted as $M_0$. Subsequently, disassembling the lithium-ion battery shell to obtain components in the shell, soaking the shell and the components in the shell in a DMC solution for 5 hours, and taking them out. Drying them in an oven at 85° C. for 24 hours, and then taking them out. Weighing the dried shell and all dried components deprived of the electrolyte, so as to obtain a total weight of the shell and components, denoted as $M_1$. Calculating the weight $M_2$ of the electrolyte in the lithium-ion battery according to the following formula: $M_2=M_0-M_1$. Dividing $M_2$ by a nominal capacity of the lithium-ion battery to obtain an electrolyte retention coefficient h of the electrolyte in the lithium-ion battery.

The electrochemical device according this application includes any device in which an electrochemical reaction occurs. Specific examples of the electrochemical device include primary batteries or secondary batteries. In particular, the electrochemical device is a lithium secondary battery, including a lithium metal secondary battery, a lithium-ion secondary battery, a lithium polymer secondary battery, or a lithium-ion polymer secondary battery.

Electronic Device

Another aspect of this application provides an electronic device, including the electrochemical device according to this application.

The uses of the electrochemical device according to this application are not particularly limited, and the electrochemical device may be used in any electronic device known in the prior art. In some embodiments, the electrochemical device according to this application is applicable to, but without being limited to: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following describes preparation of a lithium-ion battery as an example with reference to specific embodiments. A person skilled in the art understands that the preparation method described in this application are merely examples. Any other appropriate preparation methods fall within the scope of this application.

EMBODIMENTS

The following describes performance evaluation of the lithium-ion batteries according to the embodiments and comparative embodiments of this application.

I. Preparing a Lithium-Ion Battery

1. Preparing a Positive Electrode

Mixing a positive active material (lithium manganese oxide, or a mixture of lithium manganese oxide and a ternary NCM523 material mixed at a mass ratio of 8:2), conductive carbon black, and polyvinylidene difluoride at a mass ratio of 96:2:2, adding N-methyl-pyrrolidone (NMP), and mixing well with a vacuum mixer to obtain a positive slurry. Coating both sides of a positive current collector aluminum foil with the positive shiny evenly, and then drying the aluminum foil in an 85° C. oven. Performing steps such as cold calendering, cutting, and slitting, and drying the aluminum foil under an 85° C. vacuum condition for 4 hours to obtain a positive electrode.

2. Preparing a Negative Electrode

Mixing artificial graphite as a negative active material, conductive carbon black, sodium carboxymethyl cellulose (CMC) as a thickener, and styrene butadiene rubber (SBR) as a binder at a mass ratio of 96:1:1:2. Adding deionized water, and mixing well with a vacuum mixer to obtain a negative shiny. Coating both sides of a negative current collector copper foil with the negative slurry evenly, and then drying the copper foil in an 85° C. oven. Performing steps such as cold calendering, cutting, and slitting, and drying the copper foil under a 120° C. vacuum condition for 12 hours to obtain a negative electrode.

3. Preparing an Electrolyte

Formulating an electrolyte in a dry argon or nitrogen environment according to the following settings specified in the embodiments or comparative embodiments, where the content of each material in the electrolyte is a weight percent calculated based on the total weight of the electrolyte.

4. Preparing a Separator

A polyethylene (PE) porous polymer film serves as a separator.

5. Preparing a Lithium-Ion Battery

Stacking the positive electrode, the separator, and the negative electrode in sequence so that the separator is located between the positive electrode and the negative electrode, and then winding stacked structure. Welding tabs, and putting the structure into an outer package foil. Injecting the electrolyte prepared above, and performing steps such as vacuum sealing, standing, chemical formation, and shaping to obtain a lithium-ion battery.

II. Test Methods

1. Method for Testing the Rate Performance of the Lithium-Ion Battery

Putting the lithium-ion battery into a 25° C. thermostat, and leaving the battery to stand for 30 minutes so that the temperature of the lithium-ion battery is constant. After the lithium-ion battery reaches a constant-temperature state, charging the lithium-ion battery at a constant current of 1 C until the voltage reaches 4.2 V, and then charging the battery at a constant voltage of 4.2 V until the current reaches 0.05 C. Subsequently, discharging the battery at a constant current of 1 C and 5 C separately until the voltage reaches 2.8 V, so as to obtain a 1 C discharge capacity and a 5 C discharge capacity of the lithium-ion battery, respectively. Dividing the 5 C discharge capacity by the 1 C discharge capacity to obtain a 5 C capacity retention rate of the lithium-ion battery that is used for representing the rate performance of the lithium-ion battery.

2. Method for Testing Low-Temperature Discharge Performance of the Lithium-Ion Battery Putting the lithium-ion battery into a 25° C. thermostat, and leaving the battery to stand for 30 minutes so that the temperature of the lithium-ion battery is constant. After the lithium-ion battery reaches a constant-temperature state, charging the lithium-ion battery at 1 C until the voltage reaches 4.2 V and then charging the battery at a constant voltage of 4.2 V until the current reaches 0.05 C. Subsequently, putting the battery into a −20° C. thermostat, leaving the battery to stand for 4 hours, and discharging the battery at a constant current of 1 C until the voltage reaches 2.8 V to obtain a 1 C low-temperature discharge capacity of the lithium-ion battery. Dividing the 1 C low-temperature discharge capacity by the 1 C discharge capacity determined according to the "Method for testing the rate performance of the lithium-ion battery" described above, so as to obtain a 1 C low-temperature capacity retention rate of the lithium-ion battery that is used for representing the low-temperature discharge performance of the lithium-ion battery.

3. Method for Testing High-Temperature Storage Performance of the Lithium-Ion Battery Putting the lithium-ion battery into a 25° C. thermostat, and leaving the battery to stand for 30 minutes so that the temperature of the lithium-ion battery is constant. After the lithium-ion battery reaches a constant-temperature state, charging the lithium-ion battery at 1 C until the voltage reaches 4.2 V and then charging the battery at a constant voltage of 4.2 V until the current reaches 0.05 C. Measuring the thickness $S_0$ of the lithium-ion battery. Storing the lithium-ion battery in a 60° C. thermostat for 30 days, and measuring the thickness $S_1$ of the battery at 60° C. Calculating $(S_1-S_0)/S_0$ to obtain the high-temperature storage thickness expansion rate of the lithium-ion battery at 60° C. and 4.2 V.

Subsequently, cooling the lithium-ion battery to 25° C. Putting the battery into a 25° C. thermostat, and leaving the battery to stand for 30 minutes so that the temperature of the lithium-ion battery is constant. After the lithium-ion battery reaches a constant-temperature state, charging the lithium-ion battery at 1 C until the voltage reaches 4.2 V and then charging the battery at a constant voltage of 4.2 V until the current reaches 0.05 C, and then discharging the battery at a constant current of 1 C until the voltage reaches 2.8 V. Repeating the charge-and-discharge process at 25° C. for 3 cycles, and recording the $3^{rd}$-cycle discharge capacity to obtain a recovery capacity of the lithium-ion battery. Dividing the recovery capacity by the 1 C discharge capacity determined according to the "Method for testing the rate performance of the lithium-ion battery" described above, so as to obtain a high-temperature storage capacity recovery rate of the lithium-ion battery under conditions of 60° C. and 4.2 V III. Test Results Table 1 shows the components of the electrolyte used in the lithium-ion batteries in the comparative embodiments and embodiments according to this application, and the content of each component.

TABLE 1

| Serial number | DMC (%) | EMC (%) | LiBOB (%) | EC (%) | PS (%) | VC (%) | DEC (%) | PC (%) | $LiPF_6$ (%) |
|---|---|---|---|---|---|---|---|---|---|
| Comparative electrolyte 1# | / | / | 0.5 | 25 | / | 1 | 61 | / | 12.5 |
| Comparative electrolyte 2# | 42 | 30 | 0.5 | 14 | / | 1 | / | / | 12.5 |
| Comparative electrolyte 3# | 17 | 20 | 0.5 | 49 | / | 1 | / | / | 12.5 |
| Comparative electrolyte 4# | 26.5 | 30 | / | 30 | / | 1 | / | / | 12.5 |
| Comparative electrolyte 5# | 17.7 | 20 | 0.8 | 30 | / | / | 19 | / | 12.5 |
| Comparative electrolyte 6# | 25 | 30 | 1.5 | 30 | / | 1 | / | / | 12.5 |
| Comparative electrolyte 7# | 41.7 | 14 | 0.8 | 30 | / | 1 | / | / | 12.5 |
| Comparative electrolyte 8# | 51.5 | 13 | 1.5 | 10 | 1.5 | 2 | / | 8 | 12.5 |
| Comparative electrolyte 9# | 3.7 | 57 | 0.8 | 25 | | 1 | | | 12.5 |
| Electrolyte 1# | 26.7 | 30 | 0.8 | 30 | / | / | / | / | 12.5 |
| Electrolyte 2# | 25.7 | 30 | 0.8 | 30 | / | 1 | / | / | 12.5 |
| Electrolyte 3# | 40.2 | 15.5 | 0.8 | 30 | | 1 | | | 12.5 |
| Electrolyte 4# | 0.7 | 55 | 0.8 | 30 | | 1 | | | 12.5 |
| Electrolyte 5# | 5.7 | 42 | 0.8 | 35 | | 1 | | 3 | 12.5 |
| Electrolyte 6# | 21.7 | 40 | 0.8 | 24 | | 1 | | | 12.5 |
| Electrolyte 7# | 29 | 40 | 0.5 | 17 | / | 1 | / | / | 12.5 |
| Electrolyte 8# | 2.2 | 20 | 0.2 | 30 | / | 1 | 14.3 | / | 12.5 |
| Electrolyte 9# | 15 | 40 | 0.1 | 25 | / | 1 | 6.4 | / | 12.5 |
| Electrolyte 10# | 22.6 | 35 | 0.9 | 28 | / | 1 | / | / | 12.5 |
| Electrolyte 11# | 18 | 40 | 0.1 | 25 | / | 1 | 3.4 | / | 12.5 |
| Electrolyte 12# | 41.3 | 20 | 0.2 | 25 | / | 1 | / | / | 12.5 |
| Electrolyte 13# | 44.1 | 17 | 0.4 | 25 | / | 1 | / | / | 12.5 |
| Electrolyte 14# | 46 | 17 | 0.4 | 23.1 | / | 1 | / | / | 12.5 |
| Electrolyte 15# | 48.1 | 17 | 0.4 | 21 | / | 1 | / | / | 12.5 |
| Electrolyte 16# | 31 | 17 | 0.5 | 38 | / | 1 | / | / | 12.5 |
| Electrolyte 17# | 35 | 17 | 0.5 | 34 | / | 1 | / | / | 12.5 |
| Electrolyte 18# | 35 | 38 | 0.5 | 13 | / | 1 | / | / | 12.5 |
| Electrolyte 19# | 43.95 | 17 | 0.4 | 25 | 0.15 | 1 | / | / | 12.5 |
| Electrolyte 20# | 43.8 | 16.9 | 0.4 | 24.9 | 0.5 | 1 | / | / | 12.5 |
| Electrolyte 21# | 43.3 | 16.7 | 0.4 | 24.6 | 1.5 | 1 | / | / | 12.5 |
| Electrolyte 22# | 42.9 | 16.5 | 0.4 | 24.2 | 2.5 | 1 | / | / | 12.5 |
| Electrolyte 23# | 42.6 | 16.4 | 0.4 | 23.9 | 3.2 | 1 | / | / | 12.5 |
| Electrolyte 24# | 43.6 | 16.9 | 0.7 | 24.8 | 0.3 | 1 | / | / | 12.5 |
| Electrolyte 25# | 44.5 | 17.1 | 0.4 | 25.2 | / | 0.3 | / | / | 12.5 |
| Electrolyte 26# | 44.3 | 17 | 0.4 | 25 | / | 0.8 | / | / | 12.5 |
| Electrolyte 27# | 44 | 16.9 | 0.4 | 24.8 | / | 1.4 | / | / | 12.5 |
| Electrolyte 28# | 43.8 | 16.8 | 0.4 | 24.7 | / | 1.8 | / | / | 12.5 |
| Electrolyte 29# | 43.8 | 16.8 | 0.1 | 24.7 | / | 2.1 | / | / | 12.5 |
| Electrolyte 30# | 43.6 | 16.7 | 0.9 | 24.6 | / | 1.7 | / | / | 12.5 |
| Electrolyte 31# | 44.65 | 17.1 | 0.15 | 25.3 | / | 0.3 | / | / | 12.5 |
| Electrolyte 32# | 44.65 | 17.1 | 0.4 | 25.3 | / | 0.05 | / | / | 12.5 |
| Electrolyte 33# | 44.6 | 17.1 | 0.2 | 25.3 | | 0.3 | | | 12.5 |
| Electrolyte 34# | 43.2 | 16.5 | 0.3 | 24.5 | 2 | 1 | / | / | 12.5 |
| Electrolyte 35# | 42.8 | 16.3 | 0.8 | 24.1 | 2.5 | 1 | / | / | 12.5 |
| Electrolyte 36# | 42.7 | 16.3 | 0.6 | 24.1 | 2.8 | 1 | / | / | 12.5 |
| Electrolyte 37# | 43.9 | 16.9 | 0.8 | 24.9 | / | 1 | / | / | 12.5 |

"/" means that this component is not included.

4. Method for Testing the High-Temperature Cycle Performance of the Lithium-Ion Battery Putting the lithium-ion battery into a 45° C. thermostat to make the lithium-ion battery reach a constant-temperature state. After the lithium-ion battery reaches a constant-temperature state, charging the lithium-ion battery at a constant current of 1 C until the voltage reaches 4.2 V. and then charging the battery at a constant voltage of 4.2 V until the current reaches 0.05 C. Subsequently, discharging the battery at a constant current of 1 C until the voltage reaches 2.8 V, thereby completing 1 cycle. Repeating the foregoing charge-and-discharge process, recording the discharge capacity corresponding to each cycle, and recording the number of high-temperature cycles when the discharge capacity of the lithium-ion battery fades to 80% of the first-cycle discharge capacity.

The following tables show the high-temperature storage performance (high-temperature storage thickness expansion rate and high-temperature storage capacity recovery rate), the high-temperature cycle performance (number of high-temperature cycles), rate performance (5 C capacity retention rate), and low-temperature discharge performance (1 C low-temperature capacity retention rate) of the lithium-ion batteries prepared by using the foregoing electrolyte. When the comprehensive performance of a lithium-ion battery is evaluated, the indicator considered first is the high-temperature storage performance of the lithium-ion battery, the indicator considered next is the high-temperature cycle performance, and then the indicators considered later are the rate performance and the low-temperature discharge performance. Generally, the following results are unacceptable: the high-temperature storage thickness expansion rate is greater than 10%, the storage capacity recovery rate is less than 75%, the number of high-temperature cycles is less than 300, the 5 C capacity retention rate is less than 70%, or the 1 C low-temperature capacity retention rate is less than 60%.

Table 2-1 shows the performance of the electrolytes and lithium-ion batteries used in Comparative Embodiments 1 to 9 and Embodiments 1 to 10. In such comparative embodiments and embodiments, lithium manganese oxide is used as a positive active material, the electrolyte retention coefficient of the electrolyte is 2 g/Ah, and $D_{v50}$ of the positive active material is 5.5 μm.

EMC is less than 40%. The rate performance and the low-temperature discharge performance of the lithium-ion battery are extremely poor, and the comprehensive performance is relatively poor. In the comparative electrolyte 6 # used in Comparative Embodiment 6, the weight percent of the LiBOB is greater than 1%. The high-temperature storage performance, rate performance, and low-temperature discharge performance of the lithium-ion battery are relatively poor, and the comprehensive performance is relatively poor. In the comparative electrolyte 7 # used in Comparative Embodiment 7, the weight percent of the EMC is less than 15.1%. The high-temperature storage performance of the lithium-ion battery is relatively poor, and the comprehensive performance is relatively poor. In the comparative electrolyte 8 # used in Comparative Embodiment 8, the propylene carbonate (PC) is included, but the weight percent of the EMC is less than 15% and the weight percent of the LiBOB is greater than 1%. The rate performance, low-temperature discharge performance, and high-temperature storage thickness expansion rate of the lithium-ion battery are relatively poor, and the comprehensive performance is relatively poor. In the comparative electrolyte 9 # used in Comparative Embodiment 9, the weight percent of the EMC is greater than 55%. The rate performance of the lithium-ion battery is relatively poor, and the comprehensive performance is relatively poor.

TABLE 2-1

| | Serial number of electrolyte | b | a + b | c | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|---|---|
| Comparative Embodiment 1 | Comparative electrolyte 1# | 0 | 0 | 0.5 | 6.1 | 90.6 | 320 | 55.0 | 42.1 |
| Comparative Embodiment 2 | Comparative electrolyte 2# | 30 | 72 | 0.5 | 25.8 | 55.8 | 150 | 95.2 | 92.3 |
| Comparative Embodiment 3 | Comparative electrolyte 3# | 20 | 37 | 0.5 | 6.8 | 84.8 | 312 | 81.7 | 51.2 |
| Comparative Embodiment 4 | Comparative electrolyte 4# | 30 | 56.5 | 0 | 3.2 | 56.7 | 120 | 96.3 | 81.6 |
| Comparative Embodiment 5 | Comparative electrolyte 5# | 20 | 37.7 | 0.8 | 8.6 | 88.6 | 293 | 62.1 | 51.1 |
| Comparative Embodiment 6 | Comparative electrolyte 6# | 30 | 55 | 1.5 | 14.5 | 76.5 | 358 | 72.3 | 74.9 |
| Comparative Embodiment 7 | Comparative electrolyte 7# | 14 | 55.7 | 0.8 | 13.5 | 74.1 | 302 | 95.5 | 75.3 |
| Comparative Embodiment 8 | Comparative electrolyte 6# | 13 | 64.5 | 1.5 | 30.5 | 95.1 | 308 | 57.1 | 55.1 |
| Comparative Embodiment 9 | Comparative electrolyte 9# | 57 | 60.7 | 0.8 | 8.9 | 91.5 | 298 | 63.2 | 70.3 |
| Embodiment 1 | Electrolyte 1# | 30 | 56.7 | 0.8 | 7.8 | 89.1 | 308 | 94.6 | 85.3 |
| Embodiment 2 | Electrolyte 2# | 30 | 55.7 | 0.8 | 7.7 | 90.2 | 349 | 92.7 | 83.9 |
| Embodiment 3 | Electrolyte 3# | 15.5 | 55.7 | 0.8 | 9.5 | 78.2 | 312 | 94.7 | 75.7 |
| Embodiment 4 | Electrolyte 4# | 55 | 55.7 | 0.8 | 5.2 | 91.5 | 367 | 77.4 | 84.2 |
| Embodiment 5 | Electrolyte 5# | 42 | 47.7 | 0.8 | 4.9 | 91.6 | 362 | 76.3 | 73.4 |
| Embodiment 6 | Electrolyte 6# | 40 | 61.7 | 0.8 | 7.8 | 90.3 | 355 | 84.5 | 84.0 |
| Embodiment 7 | Electrolyte 7# | 40 | 69 | 0.5 | 8.9 | 79.3 | 305 | 91.2 | 94.7 |
| Embodiment 8 | Electrolyte 8# | 20 | 42 | 0.2 | 4.5 | 78.4 | 328 | 75.1 | 72.5 |
| Embodiment 9 | Electrolyte 9# | 40 | 55 | 0.1 | 4.7 | 76.5 | 301 | 83.4 | 82.5 |
| Embodiment 10 | Electrolyte 10# | 35 | 57.6 | 0.9 | 8.1 | 90.2 | 353 | 92.4 | 80.5 |

As can be seen from Table 2-1, the comparative electrolyte 1 # used in Comparative Embodiment 1 contains neither DMC nor EMC. The rate performance and low-temperature discharge performance of the lithium-ion battery are extremely poor, and the comprehensive performance is relatively poor. In the comparative electrolyte 2 # used in Comparative Embodiment 2, the total weight percent of the DMC and EMC is greater than 70%. The high-temperature storage performance and high-temperature cycle performance of the lithium-ion battery are extremely poor, and the comprehensive performance is relatively poor. In the comparative electrolyte 3 # used in Comparative Embodiment 3, the total weight percent of the DMC and EMC is less than 40%. The viscosity of the electrolyte is relatively high, and therefore, the low-temperature discharge performance of the lithium-ion battery is extremely poor, and the comprehensive performance is relatively poor. The comparative electrolyte 4 # used in Comparative Embodiment 4 contains no LiBOB. The high-temperature storage capacity recovery rate and the high-temperature cycle performance of the lithium-ion battery are extremely poor, and the comprehensive performance is relatively poor. In the comparative electrolyte 5 # used in Comparative Embodiment 5, the DEC is included, but the total weight percent of the DMC and EMC is less than 40%.

In the electrolytes 1 # to 10 # used in Embodiments 1 to 10, the weight percent b % of the EMC falls within a range of 15.1% to 55%, the weight percent of the LiBOB is greater than 0% and less than 1%, and the sum of weight percent of the DMC and EMC is greater than 40% and less than 70%. Therefore, the high-temperature storage performance, high-temperature cycle performance, rate performance, and low-temperature discharge performance of the lithium-ion battery are excellent and balanced, and the comprehensive performance is superb, and can meet the requirements of practical applications.

Table 2-2 shows the performance of the electrolytes and lithium-ion batteries used in Comparative Embodiments 10 to 18 and Embodiments 11 to 20. In such comparative embodiments and embodiments, the positive active material is a mixture of lithium manganese oxide and a ternary NCM523 material mixed at a mass ratio of 8:2, the electrolyte retention coefficient of the electrolyte is 2 g/Ah, and $D_{v50}$ of the positive active material is 5.5 μm.

TABLE 2-2

| | Serial number of electrolyte | b | a + b | c | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|---|---|
| Comparative Embodiment 10 | Comparative electrolyte 1# | 0 | 0 | 0.5 | 5.7 | 93.3 | 362 | 51.2 | 38.5 |
| Comparative Embodiment 11 | Comparative electrolyte 2# | 30 | 72 | 0.5 | 22.2 | 57.5 | 172 | 91.1 | 84.0 |
| Comparative Embodiment 12 | Comparative electrolyte 3# | 20 | 37 | 0.5 | 6.0 | 87.1 | 354 | 77.5 | 47.1 |
| Comparative Embodiment 13 | Comparative electrolyte 4# | 30 | 56.5 | 0 | 3.4 | 58.4 | 137 | 92.1 | 75.0 |
| Comparative Embodiment 14 | Comparative electrolyte 5# | 20 | 37.7 | 0.8 | 8.0 | 91.0 | 330 | 60.2 | 47.1 |
| Comparative Embodiment 15 | Comparative electrolyte 6# | 30 | 55 | 1.5 | 12.1 | 78.8 | 382 | 69.4 | 68.9 |
| Comparative Embodiment 16 | Comparative electrolyte 7# | 14 | 55.7 | 0.8 | 12.0 | 75.7 | 322 | 91.5 | 69.1 |
| Comparative Embodiment 17 | Comparative electrolyte 8# | 13 | 59 | 1.5 | 30.1 | 95.5 | 338 | 53.1 | 51.8 |
| Comparative Embodiment 18 | Comparative electrolyte 9# | 57 | 60.7 | 0.8 | 8.5 | 93.5 | 318 | 60.2 | 66.3 |
| Embodiment 11 | Electrolyte 1# | 36 | 56.7 | 0.8 | 7.7 | 91.7 | 352 | 90.1 | 78.4 |
| Embodiment 12 | Electrolyte 2# | 36 | 55.7 | 0.8 | 7.7 | 92.9 | 400 | 90.3 | 77.2 |
| Embodiment 13 | Electrolyte 3# | 15.5 | 55.7 | 0.8 | 9.0 | 81.2 | 362 | 91.3 | 69.6 |
| Embodiment 14 | Electrolyte 4# | 55 | 55.7 | 0.8 | 4.9 | 93.1 | 425 | 75.2 | 78.3 |
| Embodiment 15 | Electrolyte 5# | 42 | 47.7 | 0.8 | 4.7 | 93.3 | 420 | 74.2 | 67.4 |
| Embodiment 16 | Electrolyte 6# | 40 | 61.7 | 0.8 | 7.5 | 92.1 | 407 | 82.1 | 77.0 |
| Embodiment 17 | Electrolyte 7# | 40 | 69 | 0.5 | 8.0 | 81.8 | 357 | 88.6 | 81.1 |
| Embodiment 18 | Electrolyte 8# | 20 | 42 | 0.2 | 4.2 | 79.9 | 357 | 73.3 | 67.1 |
| Embodiment 19 | Electrolyte 9# | 40 | 55 | 0.1 | 4.2 | 77.9 | 334 | 80.1 | 75.9 |
| Embodiment 20 | Electrolyte 10# | 35 | 57.6 | 0.9 | 7.9 | 92.9 | 405 | 89.9 | 74.1 |

As can be seen from the comparative embodiments versus the embodiments in Table 2-1, when the positive active material is a mixture of lithium manganese oxide and a ternary NCM523 material mixed at a mass ratio of 8:2, the electrolyte exhibits effects similar to the circumstance in which the positive active material is lithium manganese oxide. Specifically, in Comparative Embodiments 10 to 18, the comprehensive performance is relatively poor. In Embodiments 11 to 20, the high-temperature storage performance, high-temperature cycle performance, rate performance, and low-temperature discharge performance of the lithium-ion batteries are excellent and balanced, and the comprehensive performance is superb, and can meet the requirements of practical applications.

Table 3 shows the performance of the electrolytes and lithium-ion batteries used in Embodiments 18, 19, and 21 to 23. The embodiments merely differ in the electrolyte employed. In such embodiments, the positive active material is a mixture of lithium manganese oxide and a ternary NCM523 material mixed at a mass ratio of 8:2, the electrolyte retention coefficient of the electrolyte is 2 g/Ah, and Do of the positive active material is 5.5 μm.

TABLE 3

| | Serial number of electrolyte | c/a | High-temperature storge thickness expansion rate (%) | High-temperature storage capacity recovery rate (%) | Number of high-temperature cycles | 5 C. capacity retention rate (%) | 1 C. low-temperature capacity reteation rate (%) |
|---|---|---|---|---|---|---|---|
| Embodiment 18 | Electrolyte 8# | 0.0091 | 4.2 | 79.9 | 357 | 73.3 | 67.1 |
| Embodiment 19 | Electrolyte 9# | 0.0067 | 4.2 | 77.9 | 334 | 80.1 | 75.9 |
| Embodiment 21 | Electrolyte 11# | 0.0036 | 5.2 | 76.5 | 311 | 81.2 | 76.2 |
| Embodiment 22 | Electrolyte 12# | 0.0048 | 5.7 | 75.8 | 302 | 92.5 | 75.1 |
| Embodiment 23 | Electrolyte 13# | 0.0091 | 6.4 | 84.1 | 368 | 91.0 | 74.3 |

The results show that, when the weight ratio c/a between the LiBOB and the DMC is greater than 0.006, the high-temperature storage capacity recovery rate of the lithium-ion battery is further improved, the number of high-temperature cycles is increased, and the comprehensive performance of the lithium-ion battery is further improved.

Table 4 shows the performance of the electrolytes and lithium-ion batteries used in Embodiments 23 to 25. The embodiments merely differ in the electrolyte employed. In such embodiments, the positive active material is a mixture of lithium manganese oxide and a ternary NCM523 material mixed at a mass ratio of 8:2, the electrolyte retention coefficient of the electrolyte is 2 g/Ah, and $D_{v50}$ of the positive active material is 5.5 μm.

TABLE 4

| | Serial number of electrolyte | a | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|
| Embodiment 23 | Electrolyte 13# | 44.1 | 6.4 | 84.1 | 368 | 91.0 | 74.3 |
| Embodiment 24 | Electrolyte 14# | 46 | 8.2 | 78.5 | 334 | 91.8 | 74.5 |
| Embodiment 25 | Electrolyte 15# | 48.1 | 8.9 | 77.4 | 321 | 91.7 | 75.9 |

The results show that, when the weight percent of the DMC is less than 45% (a<45), the high-temperature storage thickness expansion rate of the lithium-ion battery is further decreased, the high-temperature storage capacity recovery rate and the number of high-temperature cycles are further increased, and the comprehensive performance of the lithium-ion battery is further improved.

Table 5 shows the performance of the electrolytes and lithium-ion batteries used in Embodiments 12, 17, 23, and 26 to 28. The embodiments merely differ in the electrolyte employed. In such embodiments, the positive active material is a mixture of lithium manganese oxide and a ternary NCM523 material mixed at a mass ratio of 8:2, the electrolyte retention coefficient of the electrolyte is 2 g/Ah, and $D_{v50}$ of the positive active material is 5.5 μm.

TABLE 5

| | Serial number of electrolyte | d | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|
| Embodiment 12 | Electrolyte 2# | 30 | 7.7 | 92.9 | 400 | 90.3 | 2 |
| Embodiment 17 | Electrolyte 7# | 17 | 8.0 | 81.8 | 357 | 88.6 | 81.1 |
| Embodiment 23 | Electrolyte 13# | 25 | 6.4 | 84.1 | 368 | 91.0 | 74.3 |
| Embodiment 26 | Electrolyte 16# | 38 | 4.8 | 88.8 | 394 | 93.3 | 61.2 |
| Embodiment 27 | Electrolyte 17# | 34 | 5.2 | 88.3 | 393 | 91.8 | 72.3 |
| Embodiment 28 | Electrolyte 18# | 13 | 9.6 | 81.2 | 343 | 71.4 | 85.1 |

The results show that, when the electrolyte further includes the EC, and the weight percent of the EC is greater than 15% but not greater than 35% ($15<d\leq35$), the lithium-ion battery is excellent in the comprehensive performance such as the high-temperature storage performance, high-temperature cycle performance, rate performance, and low-temperature discharge performance.

Table 6 shows the performance of the electrolytes and lithium-ion batteries used in Embodiment 23 and Embodiments 29 to 34. The embodiments merely differ in the electrolyte employed. In such embodiments, the positive active material is a mixture of lithium manganese oxide and a ternary NCM523 material mixed at a mass ratio of 8:2, the electrolyte retention coefficient of the electrolyte is 2 g/Ah, and $D_{v50}$ of the positive active material is 5.5 μm.

TABLE 6

| | Serial number of electrolyte | d | e/c | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|---|
| Embodiment 23 | Electrolyte 13# | 0 | 0 | 6.4 | 84.1 | 368 | 91.0 | 74.3 |
| Embodiment 29 | Electrolyte 19# | 0.15 | 0.38 | 5.7 | 84.5 | 375 | 90.5 | 74.1 |
| Embodiment 30 | Electrolyte 20# | 0.5 | 1.25 | 4.3 | 85.2 | 384 | 89.7 | 73.3 |
| Embodiment 31 | Electrolyte 21# | 1.5 | 3.75 | 2.3 | 85.7 | 389 | 87.6 | 72.8 |
| Embodiment 32 | Electrolyte 22# | 2.5 | 6.25 | 1.5 | 85.9 | 393 | 84.8 | 71.0 |
| Embodiment 33 | Electrolyte 23# | 3.2 | 8 | 1.4 | 85.9 | 394 | 77.6 | 65.4 |
| Embodiment 34 | Electrolyte 24# | 0.3 | 0.43 | 9.2 | 88.8 | 390 | 89.3 | 73.2 |

The results show that, when the electrolyte further includes the PS with a weight percent of less than 3% and the weight ratio between the PS and the LiBOB falls within the range of 0.6 to 20 ($0.6\leq e/c\leq20$), the lithium-ion battery is excellent in the comprehensive performance such as the high-temperature storage performance, high-temperature cycle performance, rate performance, and low-temperature discharge performance.

Table 7 shows the performance of the electrolytes and lithium-ion batteries used in Embodiment 23 and Embodiments 35 to 43. The embodiments merely differ in the electrolyte employed. In such embodiments, the positive active material is a mixture of lithium manganese oxide and a ternary NCM523 material mixed at a mass ratio of 8:2, the electrolyte retention coefficient of the electrolyte is 2 g/Ah, and $D_{v50}$ of the positive active material is 5.5 μm.

TABLE 7

| | Serial number of electrolyte | f | f + c | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|---|
| Embodiment 23 | Electrolyte 13# | 1 | 1.4 | 6.4 | 84.1 | 368 | 91.0 | 74.3 |
| Embodiment 35 | Electrolyte 25# | 0.3 | 0.7 | 6.5 | 84.2 | 354 | 92.4 | 75.7 |
| Embodiment 36 | Electrolyte 26# | 0.8 | 1.2 | 6.4 | 84.1 | 364 | 91.2 | 74.5 |
| Embodiment 37 | Electrolyte 27# | 1.4 | 1.8 | 6.5 | 84.2 | 375 | 90.5 | 73.5 |

TABLE 7-continued

| | Serial number of electrolyte | f | f + c | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|---|
| Embodiment 38 | Electrolyte 28# | 1.8 | 2.2 | 6.5 | 84.2 | 383 | 89.8 | 72.3 |
| Embodiment 39 | Electrolyte 29# | 2.1 | 2.2 | 4.8 | 75.3 | 385 | 84.5 | 66.6 |
| Embodiment 40 | Electrolyte 30# | 1.7 | 2.6 | 9.8 | 90.1 | 402 | 82.1 | 61.3 |
| Embodiment 41 | Electrolyte 31# | 0.3 | 0.45 | 5.1 | 76.3 | 305 | 93.0 | 80.3 |
| Embodiment 42 | Electrolyte 32# | 0.05 | 0.45 | 6.5 | 84.0 | 301 | 92.5 | 77.9 |
| Embodiment 43 | Electrolyte 33# | 0.3 | 0.5 | 5.3 | 82.8 | 348 | 92.7 | 80.1 |

The results show that, when the electrolyte further includes the VC with a weight percent of less than 2% and the sum of weight percent of the VC and the LiBOB falls within the range of 0.5 to 2.5 (0.5≤f+c≤2.5), the lithium-ion battery is excellent in the comprehensive performance such as the high-temperature storage performance, high-temperature cycle performance, rate performance, and low-temperature discharge performance.

Table 8 shows the performance of the electrolytes and lithium-ion batteries used in Embodiments 18 to 22, Embodiment 35, and Embodiments 44 to 50. The embodiments merely differ in the electrolyte employed and the electrolyte retention coefficient of the electrolyte. In such embodiments, the positive active material is a mixture of lithium manganese oxide and a ternary NCM523 material mixed at a mass ratio of 8:2, and $D_{v50}$ of the positive active material is 5.5 μm.

TABLE 8

| | Electrolyte retention coefficient h (g/Ah) | Serial number of electrolyte | (e + c)/h | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|---|
| Embodiment 18 | 2 | Electrolyte 8# | 0.10 | 4.2 | 79.9 | 357 | 73.3 | 67.1 |
| Embodiment 19 | 2 | Electrolyte 9# | 0.05 | 4.2 | 77.9 | 334 | 80.1 | 75.9 |
| Embodiment 21 | 2 | Electrolyte 11# | 0.05 | 5.2 | 78.5 | 311 | 81.2 | 76.2 |
| Embodiment 22 | 2 | Electrolyte 12# | 0.10 | 5.7 | 75.8 | 302 | 92.5 | 75.1 |
| Embodiment 35 | 2 | Electrolyte 25# | 0.20 | 6.5 | 84.2 | 354 | 92.4 | 75.7 |
| Embodiment 44 | 2.7 | Electrolyte 34# | 0.85 | 2.1 | 86.1 | 390 | 87.0 | 74.6 |
| Embodiment 45 | 1.5 | Electrolyte 35# | 2.20 | 3.5 | 93.5 | 428 | 83.6 | 69.8 |
| Embodiment 46 | 0.8 | Electrolyte 36# | 4.25 | 2.4 | 91.6 | 407 | 83.5 | 68.5 |
| Embodiment 47 | 0.6 | Electrolyte 35# | 5.50 | 2.0 | 92.3 | 308 | 71.5 | 60.9 |
| Embodiment 48 | 4 | Electrolyte 35# | 0.83 | 3.7 | 85.8 | 389 | 87.2 | 74.7 |
| Embodiment 49 | 0.3 | Electrolyte 35# | 11 | 2.6 | 82.1 | 301 | 70.1 | 60.1 |
| Embodiment 50 | 3.2 | Electrolyte 35# | 1.03 | 2.3 | 88.3 | 401 | 89.2 | 75.2 |

The results show that, when the electrolyte retention coefficient h of the electrolyte and the weight percent of the LiBOB and PS satisfy 0.15≤(e+c)/h≤5, the lithium-ion battery is excellent in the comprehensive performance such as the high-temperature storage performance, high-temperature cycle performance, rate performance, and low-temperature discharge performance.

Table 9 shows the performance of the electrolytes and lithium-ion batteries used in Embodiment 23 and Embodiments 51 to 57. The embodiments merely differ in the electrolyte employed and the value (j) of $D_{v50}$ of the positive active material. In such embodiments, the positive active material is a mixture of lithium manganese oxide and a ternary NCM523 material mixed at a mass ratio of 8:2, and the electrolyte retention coefficient of the electrolyte is 2 g/Ah.

TABLE 9

| | j (μm) | Serial number of electrolyte | j × c | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|---|
| Embodiment 23 | 5.5 | Electrolyte 13# | 2.2 | 6.4 | 84.1 | 368 | 91.0 | 74.3 |
| Embodiment 51 | 2 | Electrolyte 13# | 0.8 | 7.1 | 76.7 | 307 | 93.2 | 79.5 |
| Embodiment 52 | 10 | Electrolyte 13# | 4 | 5.8 | 84.9 | 372 | 89.5 | 73.9 |
| Embodiment 53 | 15 | Electrolyte 13# | 6 | 5.7 | 85.7 | 379 | 89.1 | 73.5 |
| Embodiment 54 | 30 | Electrolyte 13# | 12 | 5.3 | 86.1 | 384 | 88.7 | 72.7 |
| Embodiment 55 | 30 | Electrolyte 37# | 24 | 7.1 | 88.5 | 390 | 87.1 | 71.9 |
| Embodiment 56 | 35 | Electrolyte 37# | 28 | 6.7 | 89.0 | 391 | 85.5 | 70.2 |
| Embodiment 57 | 40 | Electrolyte 37# | 32 | 6.5 | 89.1 | 392 | 80.1 | 65.3 |

The results show that, when the value (j) of $D_{v50}$ of the positive active material and the weight percent of the LiBOB satisfy 1≤j×c≤30, the lithium-ion battery is excellent in the comprehensive performance such as the high-temperature storage performance, high-temperature cycle performance, rate performance, and low-temperature discharge performance.

Table 10 shows how a doping element and the content of the doping element in the positive active material affect the performance of the lithium ion battery, where the electrolyte 13 # is used in all the embodiments. In such embodiments, the positive active material is a mixture of lithium manganese oxide and a ternary NCM523 material mixed at a mass ratio of 8:2. The NCM523 is doped with the doping element shown in FIG. 10. The weight percent of the doping element is adjusted to satisfy the weight percent of the doping element in the positive active material shown in Table 10. The electrolyte retention coefficient of the electrolyte is 2 g/Ah, and $D_{v50}$ of the positive active material is 5.5 μm.

TABLE 10

| | Doping element | Doping percent (%) | Gram capacity of positive active material (mAh/g) | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|---|
| Embodiment 23 | None | 0 | 114.5 | 6.4 | 84.1 | 368 | 91.0 | 74.3 |
| Embodiment 58 | Al | 1 | 114.2 | 5.2 | 86.3 | 385 | 90.3 | 73.8 |
| Embodiment 59 | Al | 0.3 | 114.4 | 5.8 | 85.1 | 377 | 90.8 | 74.2 |
| Embodiment 60 | Mg | 0.5 | 114.3 | 5.7 | 85.7 | 378 | 91.4 | 74.5 |
| Embodiment 61 | Al | 0.7 | 114.0 | 4.3 | 86.8 | 390 | 89.7 | 73.2 |
| | Ca | 0.8 | | | | | | |
| Embodiment 62 | Al | 0.8 | 113.9 | 4.1 | 87.1 | 393 | 90.7 | 73.7 |
| | Mg | 0.3 | | | | | | |
| | Ti | 0.7 | | | | | | |
| Embodiment 63 | Al | 0.5 | 114.1 | 4.6 | 87.0 | 389 | 90.2 | 74.5 |
| | Ti | 0.3 | | | | | | |
| | Nb | 0.4 | | | | | | |

TABLE 10-continued

| | Doping element | Doping percent (%) | Gram capacity of positive active material (mAh/g) | High-temperature storage thickness expansion rate (%) | High-temperature storage capacity recovery rate (%) | Number of high-temperature cycles | 5 C. capacity retention rate (%) | 1 C. low-temperature capacity retention rate (%) |
|---|---|---|---|---|---|---|---|---|
| Embodiment 64 | Al | 2.1 | 112.8 | 3.8 | 87.2 | 393 | 87.6 | 72.1 |
| Embodiment 65 | Al | 1.3 | 112.2 | 3.7 | 87.5 | 395 | 88.3 | 71.5 |
| | Mg | 0.5 | | | | | | |
| | Ti | 0.6 | | | | | | |
| Embodiment 66 | Al | 1.0 | 113.8 | 3.8 | 87.3 | 401 | 90.2 | 74.0 |
| | Mg | 0.4 | | | | | | |
| | Ti | 0.4 | | | | | | |
| | W | 0.1 | | | | | | |
| Embodiment 67 | Al | 0.7 | 114.3 | 4.9 | 86.7 | 389 | 90.7 | 74.8 |
| | W | 0.3 | | | | | | |
| Embodiment 68 | Al | 1.0 | 114.1 | 4.3 | 87.9 | 395 | 90.7 | 74.7 |
| | W | 0.3 | | | | | | |
| | B | 0.1 | | | | | | |

The results show that, when the positive active material includes a doping element (at least one selected from the group consisting of Al, Mg, Ti, Ca, Zr, W, Sr, Y, and Nb), the doping element can effectively improve the high-temperature storage thickness expansion rate, the high-temperature storage capacity recovery rate, and the number of high-temperature cycles of the lithium-ion battery without significantly affecting the gram capacity of the positive active material, so that the comprehensive performance of the lithium-ion battery is further improved.

References to "embodiments", "some embodiments", "an embodiment", "another example", "example", "specific example" or "some examples" throughout the specification mean that specified features, structures, materials, or characteristics described in such embodiment(s) or example(s) are included in at least one embodiment or example in this application. Therefore, descriptions throughout the specification, which make references by using expressions such as "in some embodiments", "in an embodiment", "in one embodiment", "in another example", "in an example", "in a specific example", or "example", do not necessarily refer to the same embodiment(s) or example(s) in this application. In addition, specific features, structures, materials, or characteristics herein may be combined in one or more embodiments or examples in any appropriate manner.

Although illustrative embodiments have been demonstrated and described above, a person skilled in the art understands that the above embodiments are not to be construed as a limitation on this application, and changes, replacements, and modifications may be made to the embodiments without departing from the spirit, principles, and scope of this application.

What is claimed is:

1. An electrolyte, comprising: dimethyl carbonate, ethyl methyl carbonate and lithium bis(oxalato) borate; wherein, based on a weight of the electrolyte, a weight percent of the dimethyl carbonate is a %, a weight percent of the ethyl methyl carbonate is b %, and a weight percent of the lithium bis(oxalato) borate is c %, and $40<a+b<70$; $15.1\leq b\leq 55$; $0<c<1$; and $a<45$.

2. The electrolyte according to claim 1, wherein $c/a>0.006$.

3. The electrolyte according to claim 1, further comprising ethylene carbonate, and, based on the weight of the electrolyte, a weight percent of the ethylene carbonate is d %, and $15<d\leq 35$.

4. The electrolyte according to claim 1, further comprising 1,3-propane sultone, and, based on the weight of the electrolyte, a weight percent of the 1,3-propane sultone is e %; and $e<3$; and $0.6\leq e/c\leq 20$.

5. The electrolyte according to claim 1, further comprising vinylene carbonate, and, based on the weight of the electrolyte, a weight percent of the vinylene carbonate is f %; and $f<2$; and $0.5\leq f+c\leq 2.5$.

6. An electrochemical device, comprising a positive electrode and an electrolyte;

wherein the electrolyte comprising: dimethyl carbonate, ethyl methyl carbonate and lithium bis(oxalato) borate; based on a weight of the electrolyte, a weight percent of the dimethyl carbonate is a %, a weight percent of the ethyl methyl carbonate is b %, and a weight percent of the lithium bis(oxalato) borate is c %, and $40<a+b<70$; $15.1\leq b\leq 55$; $0<c<1$; and $a<45$;

wherein the positive electrode comprises a positive active material, and the positive active material comprises manganese.

7. The electrochemical device according to claim 6, wherein the electrolyte further comprising ethylene carbonate, and, based on the weight of the electrolyte, a weight percent of the ethylene carbonate is d %, and $15<d\leq 35$.

8. The electrochemical device according to claim 6, wherein the electrolyte further comprising 1,3-propane sultone, and, based on the weight of the electrolyte, a weight percent of the 1,3-propane sultone is e %; and $e<3$; and $0.6\leq e/c\leq 20$.

9. The electrochemical device according to claim 6, wherein the electrolyte further comprising vinylene carbonate, and, based on the weight of the electrolyte, a weight percent of the vinylene carbonate is f %; and $f<2$; and $0.5\leq f+c\leq 2.5$.

10. The electrochemical device according to claim 6, wherein an electrolyte retention coefficient of the electrolyte is h g/Ah, and $0.15\leq(e+c)/h\leq 5$.

11. The electrochemical device according to claim 6, wherein $D_{v50}$ of the positive active material is j μm, and $1\leq j\times c\leq 30$.

12. The electrochemical device according to claim 6, wherein the positive active material further comprises a metal element A, the metal element A comprises at least one selected from the group consisting of Al, Mg, Ti, Ca, Zr, W, Sr, Y, and Nb, and, based on a weight of the positive active material, a weight percent of the metal element A is less than or equal to 2%.

13. The electrochemical device according to claim 6, wherein the positive active material comprises at least one of a compound represented by Formula (1) or a compound represented by Formula (2):

Formula (1)
$$Li_{x1}Mn_{y1}M_{z1}A_{q1}R_{r1}O_2; \quad \text{and}$$

Formula (2)
$$Li_{x2}Mn_{y2}M_{z2}A_{q2}R_{r2}O_4,$$

wherein $0.5<x1<1.2$, $0.05<y1\leq0.4$, $0.55\leq z1\leq0.95$, $0\leq q1<0.05$, $0\leq r1<0.05$;

$0.5<x1<1.2$, $1.8\leq y2\leq2.2$, $0\leq z2<0.1$, $0\leq q2<0.05$, $0\leq r2<0.05$;

M is at least one selected from Ni or Co;

A is at least one selected from Al, Mg, Ti, Ca, Zr, W, Sr, Y, Cr, or Nb; and

R is at least one selected from P, S, F, Si, or B.

14. An electronic device, comprising an electrochemical device, wherein, the electrochemical device, comprising a positive electrode and an electrolyte;

wherein the electrolyte comprising: dimethyl carbonate, ethyl methyl carbonate and lithium bis(oxalato) borate; based on a weight of the electrolyte, a weight percent of the dimethyl carbonate is a %, a weight percent of the ethyl methyl carbonate is b %, and a weight percent of the lithium bis(oxalato) borate is c %, and $40<a+b<70$; $15.1\leq b\leq55$; $0<c<1$; and $a<45$;

wherein the positive electrode comprises a positive active material, and the positive active material comprises manganese.

15. The electronic device according to claim 14, wherein the electrolyte further comprising ethylene carbonate, and, based on the weight of the electrolyte, a weight percent of the ethylene carbonate is d %, and $15<d\leq35$.

16. The electronic device according to claim 14, wherein the electrolyte further comprising 1,3-propane sultone, and, based on the weight of the electrolyte, a weight percent of the 1,3-propane sultone is e %; and $e<3$; and $0.6\leq e/c\leq20$.

17. The electronic device according to claim 14, wherein the electrolyte further comprising vinylene carbonate, and, based on the weight of the electrolyte, a weight percent of the vinylene carbonate is f %; and $f<2$; and $0.5\leq f+c\leq2.5$.

18. The electronic device according to claim 14, wherein an electrolyte retention coefficient of the electrolyte is h g/Ah, and $0.15\leq(e+c)/h\leq5$.

19. The electronic device according to claim 14, wherein $D_{v50}$ of the positive active material is j μm, and $1\leq j\times c\leq30$.

* * * * *